(12) United States Patent
Perotti et al.

(10) Patent No.: US 9,746,491 B2
(45) Date of Patent: Aug. 29, 2017

(54) SENSOR CALIBRATION BASED ON DEVICE USE STATE

(71) Applicant: Plantronics, Inc., Santa Cruz, CA (US)

(72) Inventors: Erik Perotti, Santa Cruz, CA (US); Cary Bran, Seattle, WA (US)

(73) Assignee: Plantronics, Inc., Santa Cruz, CA (US)

( * ) Notice: Subject to any disclaimer, the term of this patent is extended or adjusted under 35 U.S.C. 154(b) by 652 days.

(21) Appl. No.: 14/216,166

(22) Filed: Mar. 17, 2014

(65) Prior Publication Data

US 2015/0260754 A1 Sep. 17, 2015

(51) Int. Cl.
*G01P 21/00* (2006.01)
*G06F 1/16* (2006.01)
*H04R 1/10* (2006.01)
*H04R 1/02* (2006.01)
*H04R 3/00* (2006.01)

(52) U.S. Cl.
CPC ............ *G01P 21/00* (2013.01); *G06F 1/1633* (2013.01); *H04R 1/1041* (2013.01); *H04R 1/028* (2013.01); *H04R 3/00* (2013.01); *H04R 2201/023* (2013.01); *H04R 2499/11* (2013.01)

(58) Field of Classification Search
CPC ....... G01P 21/00; G01C 25/00; G06F 1/1633; G06F 1/3231
See application file for complete search history.

(56) References Cited

U.S. PATENT DOCUMENTS 6,753,828 B2 6/2004 Tuceryan et al.
2013/0249849 A1* 9/2013 Wong .................... G06F 1/3231
345/174

OTHER PUBLICATIONS

Fiorentino et al., Wearable Rumble Device for Active Asymmetry Measurement and Correction in Lower Limb Mobility, 2011 IEEE, 5 pp.*
Gottschalk et al., "Autocalibration for Virtual Environments Tracking Hardware," Proceedings of the 20th Annual Conference on Computer Graphics and Interactive Techniques, p. 65-72, Sep. 1993.

* cited by examiner

*Primary Examiner* — Toan Le

(57) ABSTRACT

A wearable device includes: a first sensor configured to provide a first sensor signal; a second sensor configured to provide a second sensor signal; and a processor configured to i) determine whether the wearable device is being worn based on the first sensor signal, and ii) calibrate the second sensor responsive to determining that the wearable device is being worn. Also, a holdable device includes a first sensor configured to provide a first sensor signal; a second sensor configured to provide a second sensor signal; and a processor configured to i) determine whether the holdable device is being held based on the first sensor signal, and ii) calibrate the second sensor responsive to determining that the holdable device is being held.

20 Claims, 4 Drawing Sheets

SENSOR CALIBRATION BASED ON DEVICE USE STATE

FIELD

The present disclosure relates generally to the field of electronic devices having calibratable sensors. More particularly, the present disclosure relates to calibration of such sensors.

BACKGROUND

A plethora of electronic devices are now available, many with sensors that require calibration. For example, many smartphones are now equipped with accelerometers, gyroscopes, and the like. Such sensors must be calibrated occasionally to maintain their accuracy. Without proper calibration, the outputs of such sensors may drift, thereafter producing erroneous measurements.

SUMMARY

In general, in one aspect, an embodiment features a wearable device comprising: a first sensor configured to provide a first sensor signal; a second sensor configured to provide a second sensor signal; and a processor configured to i) determine whether the wearable device is being worn based on the first sensor signal, and ii) calibrate the second sensor responsive to determining that the wearable device is being worn.

Embodiments of the wearable device can include one or more of the following features. In some embodiments, the processor is further configured to calibrate the second sensor responsive to a selected interval elapsing after determining that the wearable device is being worn. In some embodiments, the processor is further configured to calibrate the second sensor responsive to a selected interval elapsing after the wearable device is powered on. Some embodiments comprise a third sensor configured to provide a third sensor signal; wherein the processor is further configured to i) determine a motion of the wearable device based on the third sensor signal; and ii) calibrate the second sensor responsive to the motion of the wearable device being less than a threshold motion. In some embodiments, the second sensor comprises at least one of: a microphone; an accelerometer; a gyroscope; an environmental sensor; and a biometric sensor. In some embodiments, the first sensor comprises at least one of: a don/doff sensor; and a clasp detector. Some embodiments comprise a headset; a bracelet; a necklace; a ring; and a garment.

In general, in one aspect, an embodiment features a holdable device comprising: a first sensor configured to provide a first sensor signal; a second sensor configured to provide a second sensor signal; and a processor configured to i) determine whether the holdable device is being held based on the first sensor signal, and ii) calibrate the second sensor responsive to determining that the holdable device is being held.

Embodiments of the holdable device can include one or more of the following features. In some embodiments, the processor is further configured to calibrate the second sensor responsive to a selected interval elapsing after determining that the holdable device is being held. In some embodiments, the processor is further configured to calibrate the second sensor responsive to a selected interval elapsing after the holdable device is powered on. Some embodiments comprise a third sensor configured to provide a third sensor signal; wherein the processor is further configured to i) determine a motion of the holdable device based on the third sensor signal; and ii) calibrate the second sensor responsive to the motion of the holdable device being less than a threshold motion. In some embodiments, the second sensor comprises at least one of: a microphone; an accelerometer; a gyroscope; an environmental sensor; and a biometric sensor. In some embodiments, the first sensor comprises at least one of: a don/doff sensor; and a clasp detector. Some embodiments comprise at least one of: sports equipment; toys; and tools.

In general, in one aspect, an embodiment features computer-readable media embodying instructions executable by a computer in a device to perform functions comprising: receiving a first sensor signal from a first sensor; receiving a second sensor signal from a second sensor; determining whether the device is being worn or held based on the first sensor signal; and calibrating the second sensor responsive to determining that the device is being worn or held.

Embodiments of the computer-readable media can include one or more of the following features. In some embodiments, the functions further comprise: calibrating the second sensor responsive to a selected interval elapsing after determining that the device is being worn or held. In some embodiments, the functions further comprise: calibrating the second sensor responsive to a selected interval elapsing after the device is powered on. In some embodiments, the functions further comprise: receiving a third sensor signal from a third sensor; determining a motion of the device based on the third sensor signal; and calibrating the second sensor responsive to the motion of the device being less than a threshold motion. In some embodiments, the second sensor comprises at least one of: a microphone; an accelerometer; a gyroscope; an environmental sensor; and a biometric sensor. In some embodiments, the first sensor comprises at least one of: a don/doff sensor; and a clasp detector.

The details of one or more implementations are set forth in the accompanying drawings and the description below. Other features will be apparent from the description and drawings, and from the claims.

Figure 1:
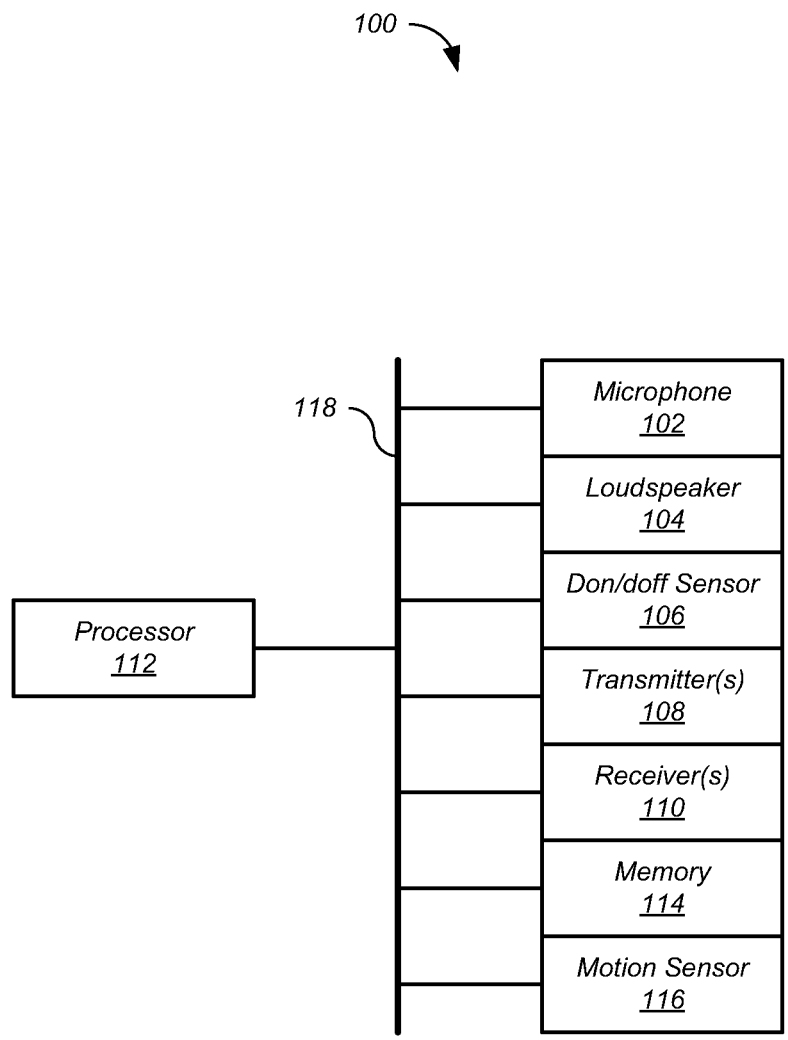
FIG. 1 shows elements of a headset according to one embodiment.

The leading digit(s) of each reference numeral used in this specification indicates the number of the drawing in which the reference numeral first appears.

DETAILED DESCRIPTION

Embodiments of the present disclosure provide sensor calibration based on the use state of the device comprising the sensor. For example, in some embodiments, the sensor is only calibrated when device is donned or held. In some embodiments, the calibration is also delayed to allow time for the sensors to warm up, for their measurements to stabilize, and the like. Other features are contemplated as well.

In one example, a user one sits down at a gaming computer and dons his headset. The headset automatically calibrates its accelerometers and gyroscopes assuming the user is looking straight ahead at a first-person shooter game.

In another example, a user sits down at a computer with multiple monitors and dons her headset. The headset automatically calibrates its accelerometers and gyroscopes assuming the user is looking straight ahead at the primary monitor.

As another example, if a headset gyroscope becomes misaligned, it is calibrated after the headset is doffed and subsequently donned.

As another example, a wearable camera may be calibrated when donned. For example, a camera mounted in a headset may be aligned with the wearer's eye level.

Calibration of a wearable or holdable device may differ based on whether the device is worn or held on the user's left or right. For example, once it is determined on which hand a bracelet with a text display is worn, calibration of the bracelet may include orienting the text so as to be readable to the wearer.

In some embodiments, the device is a wearable device, and sensor calibration is triggered when the device is worn. FIG. 1 shows elements of a headset 100 according to one embodiment. Although in the described embodiment elements of the headset 100 are presented in one arrangement, other embodiments may feature other arrangements. For example, elements of the headset 100 may be implemented in hardware, software, or combinations thereof. As another example, various elements of the headset 100 may be implemented as one or more digital signal processors.

Referring to FIG. 1, the headset 100 may include a microphone 102, a loudspeaker 104, a don/doff sensor 106, one or more transmitters 108, one or more receivers 110, a processor 112, a memory 114, and a motion sensor 116. The headset 100 may include other elements as well. The transmitters 108 and receivers 110 may include wired and wireless transmitters 108 and receivers 110. The elements of the headset 100 may be interconnected by direct connections, by a bus 118, by a combination thereof, or the like.

Figure 2:
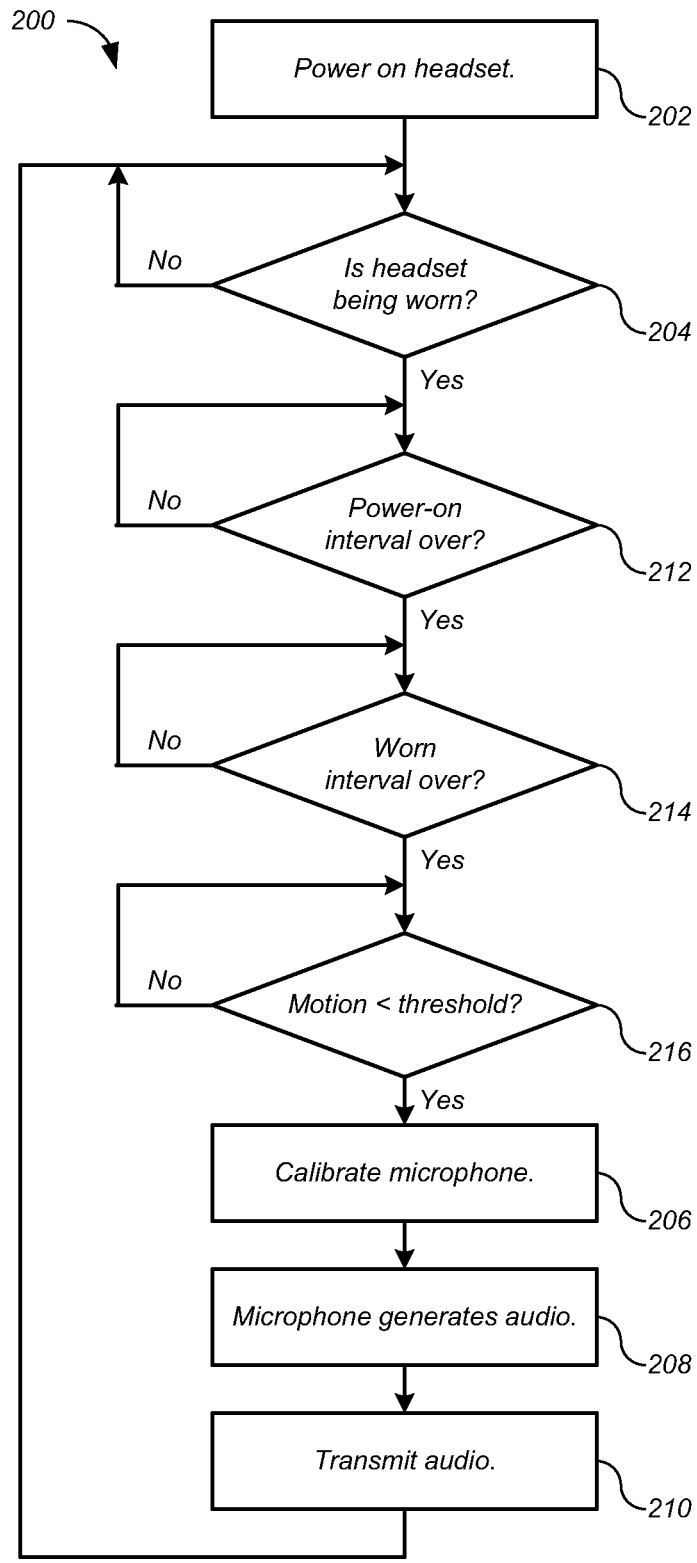
FIG. 2 shows a process for the headset of FIG. 1 according to one embodiment.

FIG. 2 shows a process 200 for the headset 100 of FIG. 1 according to one embodiment. Although in the described embodiments the elements of process 200 are presented in one arrangement, other embodiments may feature other arrangements. For example, in various embodiments, some or all of the elements of process 200 may be executed in a different order, concurrently, and the like. Also some elements of process 200 may not be performed, and may not be executed immediately after each other. In addition, some or all of the elements of process 200 may be performed automatically, that is, without human intervention.

Referring to FIG. 2, at 202, the headset 100 is powered on. That is, power is applied one or more elements of the headset 100. At 204, the processor 112 may determine the use state of the headset 100 based on signals received from the don/doff sensor 106. That is, the processor 112 determines whether the headset 100 is being worn based on the sensor signals. In one example, the don/doff sensor 106 is a capacitive sensor. However, other sensors may be used instead of, or in addition to, the capacitive sensor. For example, an optical sensor may be used.

In some embodiments, at 206, the processor 112 may calibrate the microphone 102 and/or the loudspeaker 104 responsive to determining that the headset 100 is being worn. Any calibration technique may be used. For example, to calibrate the microphone 102, the processor 112 may receive audio from the microphone, and may calibrate the gain of the microphone 102 based on the received audio.

At 208, the microphone 102 generates audio, for example responsive to speech of a wearer of the headset 100. The audio may be stored in the memory 114. At 210, one of the transmitters 108 may transmit a signal representing the audio. The signal may be received by a user device such as a smartphone, which may transmit the audio as part of a phone call. The process 200 may then resume, at 204, for further calibration operations.

In some embodiments, at 212, the processor 112 may wait for a selected "power-on" interval after the headset 100 is powered on before calibrating the microphone 102 and/or the loudspeaker 104. This interval may be selected in any manner. For example, the interval may be selected to allow time for the microphone 102 and/or the loudspeaker 104 to warm up before calibration.

In some embodiments, at 214, the processor 112 may wait for a selected "worn" interval after determining that the headset 100 is being worn before calibrating the microphone 102 and/or the loudspeaker 104. This interval may be selected in any manner. For example, the interval may be selected to allow time for sensor measurements to stabilize before calibration.

In some embodiments, at 216, the processor 112 may wait for the headset 100 to become relatively motionless before calibrating the microphone 102 or other sensors. For example, the processor 112 may determine a motion of the headset 100 based on signals produced by the motion sensor 116, and may wait for the motion to fall below a threshold motion before calibrating the microphone 102 and/or the loudspeaker 104. As another example, the processor 112 may determine a motion of the headset 100 based on received signal strength indications (RSSI) of radio signals received by the headset 100, and may wait for the RSSI to stabilize before calibrating the headset 100. In this example, calibrating may include selecting one of several devices to turn on, for example such as a TV set or the like.

The process 200 of FIG. 2 is applicable to any wearable device and calibratable sensor. For example, the wearable devices may include bracelets, rings, earrings, garments, and the like. The calibratable sensors may include accelerometers, gyroscopes, compasses, environmental sensors such as weather instruments, biometric sensors such as heart monitors, and the like. The don/doff sensors may include clasp detectors and the like, for example to determined when a bracelet is clasped.

Figure 3:
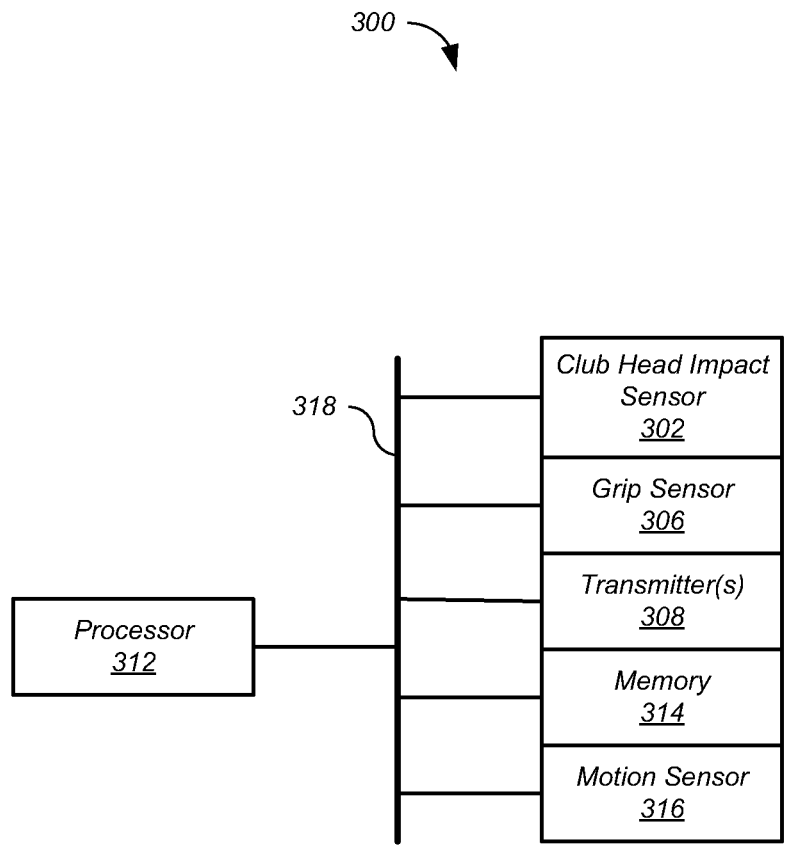
FIG. 3 shows elements of a golf club according to one embodiment.

In some embodiments, the device is a holdable device, and sensor calibration is triggered when the device is held. FIG. 3 shows elements of a golf club 300 according to one embodiment. Although in the described embodiment elements of the golf club 300 are presented in one arrangement, other embodiments may feature other arrangements. For example, elements of the golf club 300 may be implemented in hardware, software, or combinations thereof. As another example, various elements of the golf club 300 may be implemented as one or more digital signal processors.

Referring to FIG. 3, the golf club 300 may include a club head impact sensor 302, a grip sensor 306, one or more transmitters 308, a processor 312, a memory 314, and a motion sensor 316. The golf club 300 may include other elements as well. The elements of the golf club 300 may be interconnected by direct connections, by a bus 318, by a combination thereof, or the like.

Figure 4:
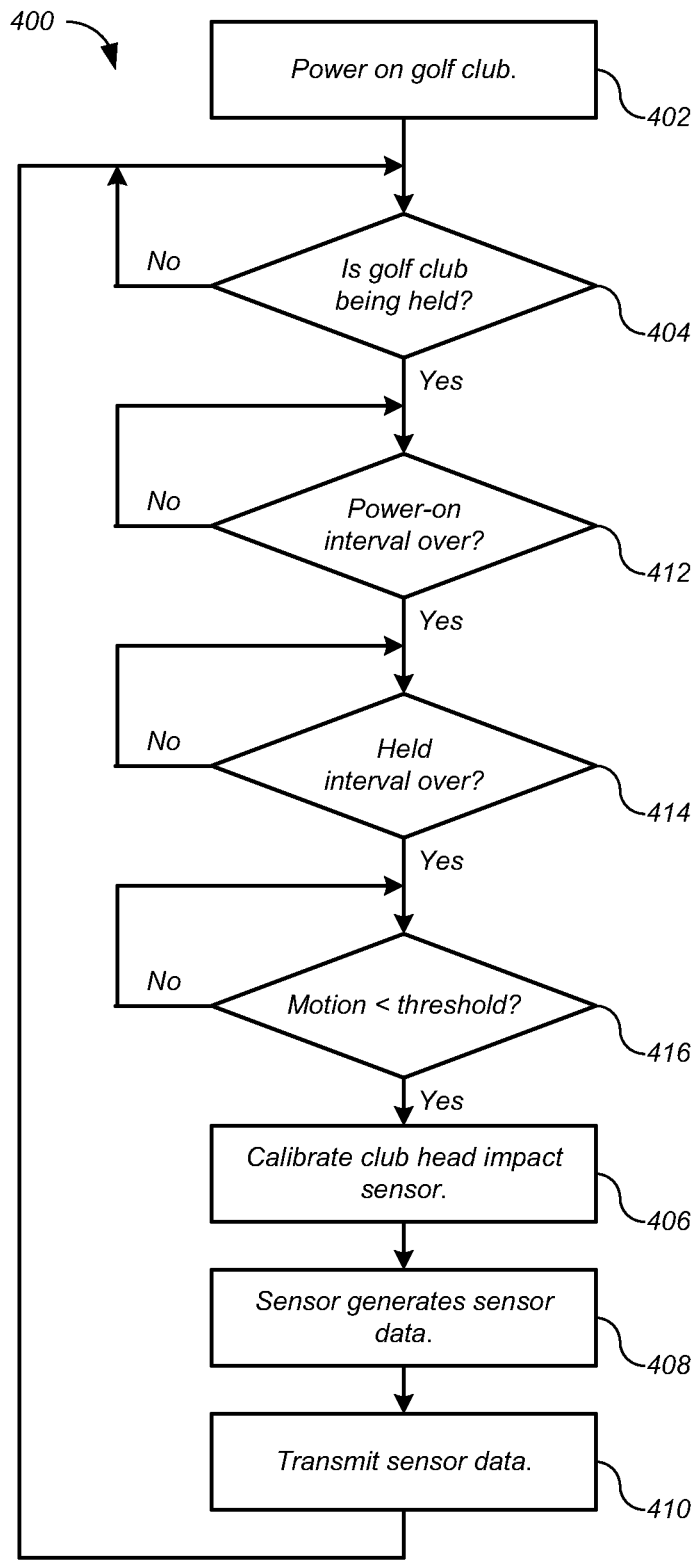
FIG. 4 shows a process for the golf club of FIG. 3 according to one embodiment.

FIG. 4 shows a process 400 for the golf club 300 of FIG. 3 according to one embodiment. Although in the described embodiments the elements of process 400 are presented in one arrangement, other embodiments may feature other arrangements. For example, in various embodiments, some or all of the elements of process 400 may be executed in a different order, concurrently, and the like. Also some elements of process 400 may not be performed, and may not be executed immediately after each other. In addition, some or all of the elements of process 400 may be performed automatically, that is, without human intervention.

Referring to FIG. 4, at 402, the golf club 300 is powered on. That is, power is applied one or more elements of the golf club 300. At 404, the processor 312 may determine the use state of the golf club 300 based on signals received from the grip sensor 306. That is, the processor 312 determines whether the golf club 300 is being held based on the sensor signals. In one example, the grip sensor 306 is a capacitive sensor. However, other sensors may be used instead of, or in addition to, the capacitive sensor.

In some embodiments, at 406, the processor 312 may calibrate the club head impact sensor 302 responsive to determining that the headset 300 is being held. Any calibration technique may be used.

At 408, the club head impact sensor 302 generates sensor data, for example responsive to the golf club 300 striking a golf ball. The sensor data may be stored in the memory 314. At 410, one of the transmitters 308 transmits a signal representing the sensor data. The signal may be received by a user device such as a smartphone, which the user may employ to review the sensor data. The process 400 may then resume, at 404, for further calibration operations.

In some embodiments, at 412, the processor 312 may wait for a selected "power-on" interval after the golf club 300 is powered on before calibrating the club head impact sensor 302. This interval may be selected in any manner. For example, the interval may be selected to allow time for the club head impact sensor 302 to warm up before calibration.

In some embodiments, at 414, the processor 312 may wait for a selected "held" interval after determining that the golf club 300 is being held before calibrating the club head impact sensor 302. This interval may be selected in any manner. For example, the interval may be selected to allow time for sensor measurements to stabilize before calibration.

In some embodiments, at 416, the processor 312 may wait for the golf club 300 to become relatively motionless before calibrating the club head impact sensor 302. For example, the processor 312 may determine motion of the golf club 300 based on signals produced by the motion sensor 316, and may wait for the motion to fall below a threshold motion before calibrating the club head impact sensor 302.

The process 400 of FIG. 4 is applicable to any holdable device and calibratable sensor. For example, the holdable devices may include sports equipment, toys, tools, and the like. The calibratable sensors may include accelerometers, gyroscopes, compasses, environmental sensors such as weather instruments, biometric sensors, and the like.

Various embodiments of the present disclosure may be implemented in digital electronic circuitry, or in computer hardware, firmware, software, or in combinations thereof. Embodiments of the present disclosure may be implemented in a computer program product tangibly embodied in a computer-readable storage device for execution by a programmable processor. The described processes may be performed by a programmable processor executing a program of instructions to perform functions by operating on input data and generating output. Embodiments of the present disclosure may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A wearable device comprising:
a first sensor configured to provide a first sensor signal;
a second sensor configured to provide a second sensor signal; and
a processor configured to
  i) determine whether the wearable device is being worn based on the first sensor signal, and
  ii) calibrate the second sensor responsive to determining that the wearable device is being worn.

2. The wearable device of claim 1, wherein:
the processor is further configured to calibrate the second sensor responsive to a selected interval elapsing after determining that the wearable device is being worn.

3. The wearable device of claim 1, wherein:
the processor is further configured to calibrate the second sensor responsive to a selected interval elapsing after the wearable device is powered on.

4. The wearable device of claim 1, further comprising:
a third sensor configured to provide a third sensor signal;
wherein the processor is further configured to
  i) determine a motion of the wearable device based on the third sensor signal; and
  ii) calibrate the second sensor responsive to the motion of the wearable device being less than a threshold motion.

5. The wearable device of claim 1, wherein the second sensor comprises at least one of:
a microphone;
an accelerometer;
a gyroscope;
an environmental sensor; and
a biometric sensor.

6. The wearable device of claim 1, wherein the first sensor comprises at least one of:
a don/doff sensor; and
a clasp detector.

7. The wearable device of claim 1, further comprising at least one of:
a headset;

a bracelet;
a necklace;
a ring; and
a garment.

8. A holdable device comprising:
a first sensor configured to provide a first sensor signal;
a second sensor configured to provide a second sensor signal; and
a processor configured to
i) determine whether the holdable device is being held based on the first sensor signal, and
ii) calibrate the second sensor responsive to determining that the holdable device is being held.

9. The holdable device of claim 8, wherein:
the processor is further configured to calibrate the second sensor responsive to a selected interval elapsing after determining that the holdable device is being held.

10. The holdable device of claim 8, wherein:
the processor is further configured to calibrate the second sensor responsive to a selected interval elapsing after the holdable device is powered on.

11. The holdable device of claim 8, further comprising:
a third sensor configured to provide a third sensor signal;
wherein the processor is further configured to
i) determine a motion of the holdable device based on the third sensor signal; and
ii) calibrate the second sensor responsive to the motion of the holdable device being less than a threshold motion.

12. The holdable device of claim 8, wherein the second sensor comprises at least one of:
a microphone;
an accelerometer;
a gyroscope;
an environmental sensor; and
a biometric sensor.

13. The holdable device of claim 8, wherein the first sensor comprises at least one of:
a don/doff sensor; and
a clasp detector.

14. The holdable device of claim 8, further comprising at least one of:
sports equipment;
toys; and
tools.

15. A memory comprising a computer-readable storage device tangibly embodying instructions executable by a computer in a device to perform functions comprising:
receiving a first sensor signal from a first sensor;
receiving a second sensor signal from a second sensor;
determining whether the device is being worn or held based on the first sensor signal; and
calibrating the second sensor responsive to determining that the device is being worn or held.

16. The memory of claim 15, wherein the functions further comprise:
calibrating the second sensor responsive to a selected interval elapsing after determining that the device is being worn or held.

17. The memory of claim 15, wherein the functions further comprise:
calibrating the second sensor responsive to a selected interval elapsing after the device is powered on.

18. The memory of claim 15, wherein the functions further comprise:
receiving a third sensor signal from a third sensor;
determining a motion of the device based on the third sensor signal; and
calibrating the second sensor responsive to the motion of the device being less than a threshold motion.

19. The memory of claim 15, wherein the second sensor comprises at least one of:
a microphone;
an accelerometer;
a gyroscope;
an environmental sensor; and
a biometric sensor.

20. The memory of claim 15, wherein the first sensor comprises at least one of:
a don/doff sensor; and
a clasp detector.

* * * * *